United States Patent Office 3,361,816
Patented Jan. 2, 1968

3,361,816
NOVEL THERAPEUTIC COMPOUNDS AND PROCESSES FOR THEIR MANUFACTURE
John G. Topliss, West Caldwell, and Nathan Sperber, North Caldwell, N.J., and Alan A. Rubin, Rockville Centre, N.Y., assignors to Schering Corporation, Bloomfield, N.J., a corporation of New Jersey
No Drawing. Original application Feb. 20, 1961, Ser. No. 90,198. Divided and this application Nov. 21, 1966, Ser. No. 595,578
5 Claims. (Cl. 260—556)

ABSTRACT OF THE DISCLOSURE

The invention relates to N-acylated-o-sulfamylaniline intermediates useful for the preparation of therapeutically useful 1,2,4-benzothiadiazine-1,1-dioxides. Exemplary of the preparation of and the conversion of the intermediate to the desired therapeutic agent is the following: Reflux a mixture containing 2-sulfamyl-4-chloroaniline with acetyl chloride or acetic anhydride in toluene to produce 2-sulfamyl-4-chloro acetanilide. Upon heating the intermediate above its melting point there is produced the therapeutically useful agent 3-methyl-7-chloro-1,2,4-benzothiadiazine-1,1-dioxide.

---

This application is a divisional application of our copending application, Ser. No. 90,198, filed Feb. 20, 1961, said application now being abandoned.

This invention relates to novel benzothiadiazine processes for the manufacture thereof and compositions containing such compounds.

The invention resides in part in the concept of chemical compounds in which there is attached to a 1,2,4-benzothiadiazine-1,1-dioxide nucleus, otherwise unsubstituted in the heterocyclic portion of the nucleus, a saturated lower aliphatic hydrocarbon radical in the 3-position, and attached to the benzenoid moiety of the benzothiadiazine nucleus is not more than two substituents, at least one of which is selected from the group consisting of halogen and trifluoromethyl.

It is known to chemists that a 1,2,4-benzothiadiazine-1,1-dioxide may exist in either one or both of two tautomeric forms. In one form the double bond is between the 3- and 4-position atoms, while in the other form the double bond is between the 2- and 3-position atoms. Although within this specification is shown only one tautomer, both tautomers are contemplated as being within the scope of this invention.

The novel compounds of this invention are of the following structural formula:

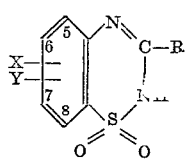

and include the non-toxic alkali metal salts thereof, wherein R is a member of the group consisting of lower alkyl, cyclopropyl, cyclobutyl and cyclopentyl; X is a member of the group consisting of halogen and trifluoromethyl radicals, said X radical being attached to one of the positions 6 and 7; and Y is a member of the group consisting of hydrogen, halogen, trifluoromethyl, and lower alkyl radicals, said Y radical being attached to one of the unsubstituted positions 6, 7, and 8.

As used herein, the term "saturated lower aliphatic hydrocarbon" means lower alkyl radicals, including the straight and branched-chain radicals illustrated by methyl, ethyl, propyl, isopropyl, n-butyl, t-butyl, amyl, isoamyl. The term "halogen" includes all halogens but preferably chlorine and bromine.

It is well-known that diuretics of the chlorothiazide type, i.e., those compounds which differ from the compounds of this invention in that they have a sulfamyl group attached to the benzenoid portion of the nucleus, usually in the 7-position mildly reduce blood pressure in patients having hypertension. These compounds, however, do not demonstrate this activity under normotensive conditions. Quite unexpectedly, we have discovered that the novel compounds of this invention exhibit blood pressure lowering activity despite the fact that they possess no significant diuretic activity. Indeed, not only are they non-diuretic, but in some instances they may have anti-diuretic effects.

The novel compounds are useful in the alleviation and control of essential hypertension, malignant hyptertension, and the like, and peripheral vascular disorders.

The effective dosage of the compositions of this invention depends upon the severity, the stage, and the individual characteristics of each case. Generally, a range of from about 0.25 to about 15 mg. per kilogram of body weight per day would constitute the dosage range for the general class of compounds, with a range of 0.25 to 2.5 mg. per kg. per day for the preferred compounds.

The novel compounds of our invention may be used in the form of pharmaceutical preparations which contain the active ingredient in admixture with a pharmaceutical carrier suitable for enteral or parenteral administration. Such preparations may be in solid forms, as for example, tablets, capsules and suppositories, or in liquid forms, as for example, elixirs, emulsions and injectables.

In the formulation of pharmaceutical preparations there can be employed such substances which do not react with the active substances, as for example, water gelatin, lactose, starches, magnesium stearate, calcium carbonate, talc, vegetable oils, benzyl alcohols, gums, polyalkylene glycols, and petroleum jelly. The active ingredient is preferably present in the preparation in such proportions by weight that the proportion by weight of active ingredient in the formulation to be administered lies between 0.1% and 50%.

There also may be incorporated into the aforementioned pharmaceutical dosage forms an additional active ingredient such as a therapeutically effective quantity of a diuretic agent.

Representative preparations are illustrated below with the preparations administerable once to several times per day.

TABLET FORMULATION

The following formulation provides for the manufacture of 1000 tablets:

| | G. |
|---|---|
| (1) 3 - methyl - 7 - chloro - 1,2,4-benzothiadiazine-1,1,-dioxide | 25 |
| (2) Lactose, U.S.P. | 181 |
| (3) Corn starch, U.S.P. | 92.5 |
| (4) Magnesium stearate | 1.5 |

Thoroughly granulate a mixture of 72.5 g. of corn starch and the lactose with a paste prepared by dissolving 20 gm. of corn starch in 100 ml. of hot distilled water. Dry the resulting granulation at 40–45° C. and pass it through a No. 16 mesh screen. To the dried, screened granulation add a blended mixture of the active ingredient (1) and the magnesium stearate. Thoroughly blend and then press into tablets of 300 mg. each.

CAPSULE FORMULATION

The formulation provides for the manufacture of 1000 capsules:

|  | G. |
|---|---|
| (1) 3 - methyl - 7 - chloro - 1,2,4-benzothiadiazine-1,1-dioxide | 25 |
| (2) Lactose | 273.5 |
| (3) Magnesium stearate | 1.5 |

Mix active ingredient (1) with the lactose and blend in the magnesium stearate. Fill hard gelatin capsules with 300 mg. each of the blended mixture to produce capsules containing 25 mg. of 3-methyl-7-chloro-1,2,4-benzothiadiazine-1,1-dioxide.

PARENTERAL FORMULATION

The following formulation provides for the manufacture of 1000 vials each containing 10 mg. of active ingredient, as its sodium salt:

| (1) 3-methyl-7-chloro-1,2,4-benzothiadiazine - 1,1-dioxide sodium salt | gm | 10.95 |
|---|---|---|
| (2) Monobasic potassium phosphate | gm | 6.0 |
| (3) Water for injection, U.S.P. q.s. | liter | 1.0 |

Dissolve ingredients (1), (2), and (3) in approximately 80 percent of the volume of water and filter the resulting solution. Add to the filtrate sufficient water to make to a 1000 ml. volume. Sterile-filter the solution and asceptically fill one milliliter portions of the so-prepared solution into two milliliter vials then lyophylize. After the lyophylized cake is dry, asceptically stopper the vials with rubber plugs and seal.

In order to prepare the novel compounds, it is preferred to employ as a starting material an X,Y-substituted o-sulfamylaniline or a derivative thereof, wherein X and Y are as hereinabove defined. These substances may be transformed directly into the 1,2,4-benzothiadiazine-1,1,-dioxides of the present invention or they may be transformed into a further intermediate which itself may be cyclized to form the end product.

The X,Y-substituted o-sulfamylanilines can be prepared according to a procedure which comprises treating an X,Y-substituted o-chloronitrobenzene (II) with a mixture of thiourea, benzyl chloride and alkali, yielding an o-thioether (III) which compound is then sequentially treated with chlorine in aqueous acid, and then ammonia, to yield a nitrosulfonamide (IV). The nitrosulfonamide is reduced, as with iron in ammonium chloride solution to yield an X,Y-substituted o-sulfamylaniline (V). This general preparative reaction is shown below in Reaction Scheme A:

A:

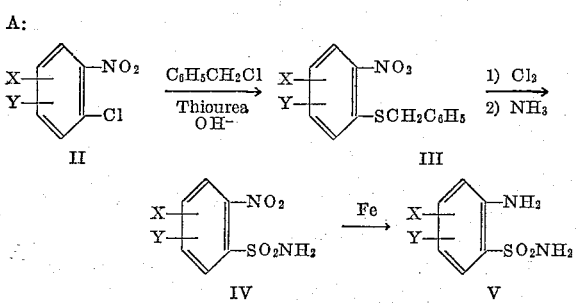

In general, if a particular o-nitrochlorobenzene (II) is not known, it may be prepared by any of the usual well-known and analogous procedures.

The key step in the process is the reaction of the o-sulfamylaniline (V) with a reagent such as an ortho ester, $RC(OR^1)_3$, an alkoxy-R-substituted aldehyde acetal, $R^2O-CH(R)-CH(OR^1)_2$, a carboxylic acid, $RCOOH$, or a derivative thereof such as the corresponding acid halide, anhydride, amide and simple lower alkyl esters, or other chemically equivalent compounds which, under the reaction conditions, are convertible thereinto. For each of these reactants except for the acetal, R is representative of the saturated lower aliphatic hydrocarbon radical which it is desired to have appear in the 3-position of the compounds of this invention and $R_1$ and $R_2$ represent lower alkyl. In the case of the acetal reaction, the moiety (R) CH— is the saturated lower aliphatic hydrocarbon radical (less one hydrogen atom) which ultimately appears as the substituent at the 3-position. During the reaction the substituent completes its hydrogen requirement. In these reactions all reactants are essentially equivalent in ultimately producing the end product. Thus, the reaction of 2-sulfamyl-4-chloraniline (IV) with ethyl orthoacetate or α-methoxyacetaldehyde diethyl acetal or acetic acid, acetyl chloride, acetic anhydride or ethyl acetate will ultimately result in the formation of 3-methyl-7-chloro-1,2,4-benzothiadiazine-1,1-dioxide. It is understood that minor variations in reaction conditions may be necessary to effect the transformation, said variations dependent upon the nature of the reactant as set forth below. The novel 1,2,4-benzothiadiazine-1,1-dioxides (I) are thus prepared by heating the o-sulfamylaniline starting material (V) with reactants such as the above mentioned ortho esters, carboxylic acids, acid halides and acid anhydrides and acetals. When the carboxylic acids, acid halides or acid anhydrides are used as reactants, a catalyst is usually necessary in order to directly produce the appropriate 1,2,4-benzothiadiazine-1,1-dioxide without first forming intermediary substances, although in certain instances the product can be directly formed by heating the reactants at much higher temperatures without the use of a catalyst. When used, the catalyst may be basic, such as the alkali metal salts of the corresponding carboxylic acids or a tertiary amine such as pyridine, picolines or lutidines, or acidic, such as perchloric acid.

When reacting the o-sulfamylaniline starting material (V) with an ortho ester, the reaction is generally carried out at above room temperatures. If in the absence of a solvent, the temperature range is from about 40° C. to the boiling point of the particular ortho ester, although a temperature range of about 80–130° C. is preferred. If the reaction is carried out in the presence of an inert organic solvent, the temperature is usually maintained at about the reflux temperature of the reaction mixture. Solvents such as dioxane or dimethylene glycol dimethyl ether are preferred but other suitable non-reactive solvents may also be used.

With a carboxylic acid reactant, the reaction is preferably effected with catalysis, under pressure, and with increased temperatures in the range of about 130–200° C., although it is preferred to use temperatures between about 160° and 170° C.

With an acid halide or acid anhydride reactant, such reactant in excess is heated with the o-sulfamylaniline starting material (V) in the presence of one of the above described catalysts.

These afore-described chemically equivalent preparations are illustrated as follows in Reaction Scheme B:

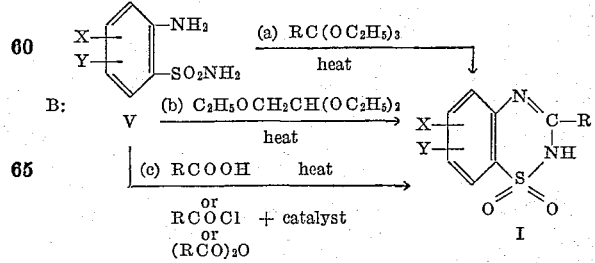

In the foregoing scheme, X, Y, and R are as hereinabove defined. The ortho ester reactant in B(a) is shown as being an ethyl ester, however, it is understood that other common lower alkyl esters may be similarly employed without changing the final product, since the alkoxy groups are eliminated during the reaction. The acetal reactant (in B(b)) is shown as ethoxyacetaldehyde diethyl acetal. It is understood that any lower alkyl acetal may be used or any lower alkoxy group may be employed in place of the ethoxy groups depicted, since these groups are eliminated during the reaction. The controlling feature of the acetal reactant is the structure of the α-carbon atom and its substituents. For example, by employing α-ethoxy-propionaldehyde acetal, the product (I) would have a 3-ethyl substituent.

The immediate preceding description is of reactants and reactions which in essentially one step produce an X,Y-substituted-3-R-1,2,4-benzothiadiazine-1,1-dioxide (I). By slight variations in conditions, various intermediates are producable which themselves can be converted to one final product. For example, if the catalyst is omitted during the reaction betwen the o-sulfamylaniline starting material (V) and the acid halide or acid anhydride, there is produced the correspondingly N-acylated-o-sulfamylaniline intermediate (VI). This reaction is generally effected in an inert aromatic hydrocarbon solvent such as benzene, toluene, xylene and the like, preferably at reflux temperatures. Other solvents such as di-alkyl ethers, cyclic ethers and such may also be used. The acylated intermediate is isolated, heated above its melting point whereupon cyclization occurs forming the appropriate 1,2,4-benzothiadiazine-1,1-dioxide (I). An example of the foregoing is the reaction of 2-sulfamyl-4-chloroaniline with acetyl chloride or acetic anhydride in refluxing toluene whereupon there is produced 2-sulfamyl-4-chloro acetanilide. Upon heating this intermediate above its melting point, there is produced 3-methyl-7-chloro-1,2,4-benzothiadiazine-1,1-dioxide. It is apparent that by varying the o-sulfamyl starting material or the acylating agent, the various final compounds falling within the scope of this invention may be readily prepared.

By changing the solvent in the foregoing to a tertiary amine such as the pyridines, a diacylated intermediate (VII) is produced; one acyl group being on the aniline nitrogen atom, and the other on the sulfamyl nitrogen atom. The diacylated intermediate is cyclized to the 1,2,4-benzothiadiazine-1,1-dioxide in like manner simply by heating above its melting point. These reactions may be illustrated as follows in Reaction Scheme C:

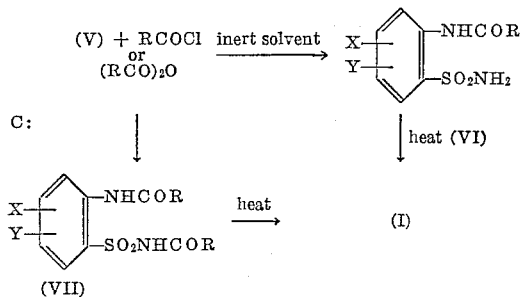

Another equivalent reaction involving a modification of the starting material is that shown in Reaction Scheme D:

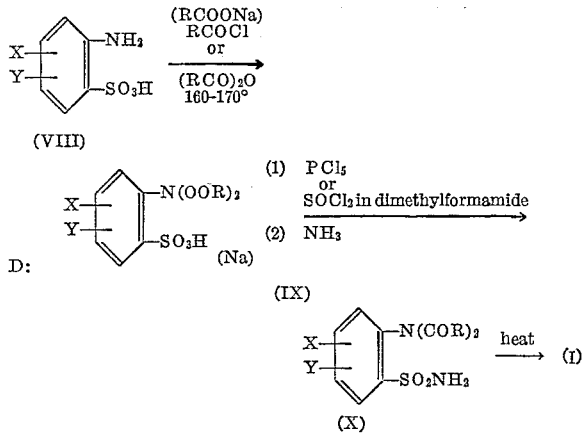

In this reaction an X,Y-substituted orthanilic acid (VIII) is employed as starting material and transformed as shown. Diacylation produces IX (in the form of its sodium salt when RCOONa has been used). Compound IX is transformed by known methods to the N,N-di-acyl-sulfonamide, X which may spontaneously cyclize to (I) or be converted by heating to the cyclized products of this invention (I), depending on the nature of the substituents X, Y or R.

Reaction Schemes B, C, and D all employ an aniline derivative as starting material. Under some circumstances it may be desirable to utilize precursors of the aniline compounds such as the sulfamyl nitrobenzene (IV) prepared in Reaction Scheme A. This substance is convertible to the novel end products (I) by reactions chemically equivalent to B, C, and D but providing different intermediates. Such a transformation is shown in Reaction Scheme E:

E:

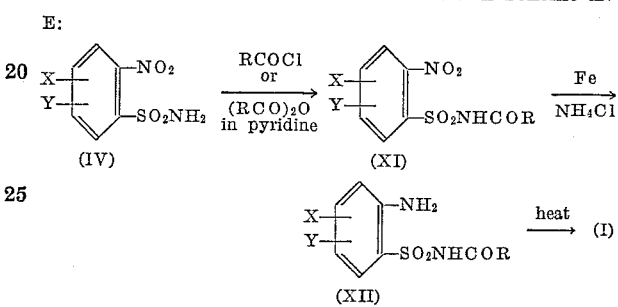

In this reaction acylation of the sulfonamide group is first effected to yield (XI) which upon reduction as analogously described in Scheme A forms the acylated intermediate, (XII). It is to be noted that (XII) is an isomer of (VI), Scheme C, and is similarly converted to the end product (I) by heating.

In Reaction Schemes A and D, intermediary sulfonamides (IV and X) are formed by amination of a sulfamyl chloride with ammonia. Equivalent compounds are produced by amination with a lower alkyl primary amine or an aralkyl amine, preferably benzyl amine. Their corresponding transformation products will carry this substituent which is eliminated during the conversion to the 1,2,4-benzothiadiazine-1,1-dioxide (I). For example, if benzyl amine is used, the starting material (V) in Scheme C would possess a benzyl substituent on the sulfamyl nitrogen atom. This substance is acylated as described and during the heating of the acylated product the benzyl group is eliminated and (I) is formed. An analogous reaction occurs in Schemes D, E and in that part of B pertaining to the reaction with carboxylic acids or derivatives thereof.

The ortho ester reaction of Scheme B is also applicable to the starting material (V) containing a benzyl or a lower aliphatic hydrocarbon substituent on the sulfamyl nitrogen atom. However, in this instance, if the substituent is a lower aliphatic hydrocarbon it must possess at least three carbon atoms and is preferably isopropyl or alkyl. The reaction then proceeds in two steps with the formation of an intermediate (XIV) which upon heating forms (I). This is shown in Reaction Scheme F:

F:

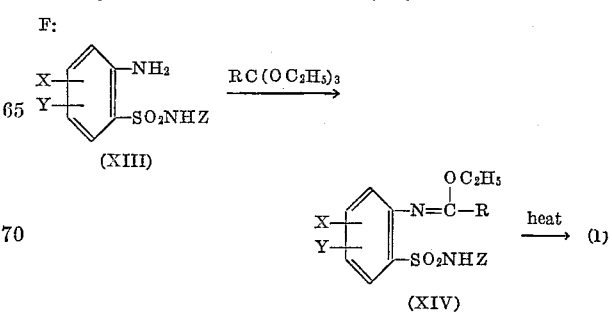

Z=benzyl or a lower aliphatic hydrocarbon having at least 3 carbons.

All of the foregoing give rise to 1,2,4-benzothiadiazine-1,1-dioxides. It is known how to produce 3,4-dihydro-1,2,4-benzothiadiazine-1,1-dioxides such as by reacting a sulfamylaniline with an aldehyde or acetal. These dihydro compounds may be oxidized to the corresponding unsaturated compounds of this invention (I) by reaction with agents such as potassium permanganate in acetone, and the like. There is thus contemplated as being within the scope of this invention other obvious means of introducing a 3,4-double bond into a 3,4-dihydro-1,2,4-benzothiadiazine-1,1-dioxide so as to form the unsaturated analog. This may be effected by oxidation or dehydrohalogenation. The latter, for example, is applicable to the conversion of 3-chloromethyl-7-chloro-3,4-dihydro-1,2,4-benzothiadiazine-1,1-dioxide. By heating this substance with a mild base such as potassium cyanide, there is formed 3-methyl-7-chloro-1,2,4-benzothiadiazine-1,1-dioxide.

It is thus apparent that many paths, all equivalent, are open to the production of the novel compounds (I). Exemplary of such obvious alternative routes are methods which effect the production of 1,2,4-benzothiadiazine-1,1-dioxides having an R-substituent at C–3 but no substituent in the benzenoid portion. Chlorination or bromination is then effected to introduce the halogenation in the 7-position. Alternatively, other groups such as amino may be carried through and then eliminated by conventional methods such as diazotization techniques. For example, by the processes described herein, one can produce 3-methyl - 6 - amino - 7 - chloro - 1,2,4 - benzothiodiazine-1,1-dioxide by employing the appropriate starting materials and intermediates. This compound, although not a final therapeutic end product as defined herein, may obviously be transformed to 3-methyl-7-chloro-1,2,4-benzothiadiazine-1,1-dioxide by the diazotization technique in the presence of cuprous chloride.

Other such equivalent procedures include the selective reduction of halogenated alkyl radicals appearing in the 3-position of a benzothiadiazine-1,1-dioxide, or the decarboxylation reactions of a carboxyalkyl radical in the 3-position of said compounds. Examples of such procedures would be the transformation of 3-chloromethyl-7-chloro-1,2,4-benzothiadiazine-1,1-dioxide and 3-carboxymethyl-7-chloro-1,2,4-benzothiadiazine-1,1-dioxide to 3-methyl-7-chloro-1,2,4-benzothiadiazine-1,1-dioxide.

It is also apparent that other types of equivalent procedures may be followed to produce the compounds of this invention. Such techniques as heating a starting material with a reactant, which under the conditions of the reaction will be converted into one of the above described reactants are also embraced as chemical equivalents to this invention, and as such are included herein. This type of technique may be illustrated by the reaction wherein a RCCl$_3$ type compound is heated at elevated temperatures with an o-sulfamylaniline starting material, in an alcohol solvent in the presence of a strong base. By this procedure the RCCl$_3$ reactant is probably transformed to a carboxylic acid which then reacts with the o-sulfamylaniline. For example, by heating 2-sulfamyl-4-chloroaniline with 1,1,1-trichloroethane there is ultimately produced 3-methyl-7-chloro-1,2,4-benzothiadiazine-1,1-dioxide.

From the foregoing, it is evident to one skilled in the art of chemical synthesis that the compounds of this invention may also be manufactured by such other methods or processes as are described in published patent and technical literature.

The following examples will serve to further exemplify and illustrate the nature of these various reactions, and to further demonstrate the scope of the various groups which may be present in particular positions, and to further demonstrate the various intermediary compounds hereinabove described.

These examples, however, are not intended and should not be construed in any way so as to limit the scope of the present invention, but are presented for illustrative purposes only.

PREPARATION OF STARTING MATERIALS

*Example 1.—2-sulfamyl-4-chloroaniline*

Step A.—Mix 63 g. of benzyl chloride, 38 g. of thiourea, 3 drops of concentrated ammonium hydroxide solution, and 250 ml. of 95% ethanol. Reflux the mixture for 3 hours. Cool and add a solution containing 96 g. of 2,4-dichloro-nitrobenzene in 200 ml. of ethanol. Heat the mixture to reflux and then add dropwise a solution of 70 g. of potassium hydroxide in 500 ml. of ethanol. Continue refluxing for 2 hours, and then cool and filter the solids produced. Wash the solid with aqueous ethanol and dry. There is thus produced 2 - benzylthio - 4 - chloro - nitrobenzene. (A compound corresponding to III above.)

Step B.—Suspend 50 g. of 2-benzylthio-4-chloro-nitrobenzene in 1000 ml. of 33% aqueous acetic acid. Bubble chlorine gas through the suspension during a period of 2 hours, while maintaining the suspension at a temperature in the range of about 0°–5° C.

Extract the mixture 3 times with 400 ml. each of chloroform, pool the extracts, and wash the chloroform solution with water. Dry the chloroform solution with anhydrous sodium sulfate and filter.

Step C.—Evaporate the dried chloroform solution to a residue, add to the residue 400 ml. of liquid ammonia, stir and allow the excess ammonia to evaporate, triturate the residue with hexane to form a crystalline solid, continue trituration with water, and filter the solid to yield substantially pure 2-sulfamyl-4-chloro-nitrobenzene. (A compound corresponding to IV above.) Recrystallize from aqueous methanol.

Step D.—Mix together 4.4 g. of ammonium chloride, 18 ml. of methanol, 9 ml. of water and 3.0 g. of 2-sulfamyl-4-chloro-nitrobenzene. Heat the mixture to reflux. Add portionwise 4.4 g. of iron filings during a period of about 1½ hours. Cool the mixture and filter. Concentrate the filtrate to a residue. Triturate the residue with 15 ml. of water and filter the solid. Recrystallize the solid from aqueous methanol to yield substantially pure 2-sulfamyl-4-chloroaniline. (A compound corresponding to V above.)

As is apparent to one skilled in the art, by replacing the 2,4-dichloronitrobenzene of Example 1, with other appropriately substituted 2-chloro-nitrobenzenes the production of other o-sulfamylanilines starting materials may be effected by following substantially the procedures described in Example 1.

Therefore, by replacing the aforesaid 2,4-dichloro-nitrobenzene with the particular substituted 2-chloro-nitrobenzenes (II) enumerated below in Group A, and by following substantially the procedures of Steps A, B, C and D exemplified above, there are produced, respectively, the appropriate intermediates III and IV, and the corresponding 2-sulfamylaniline compounds (V) enumerated below in Group B.

Group A (1) 2,4,5-trichloro-nitrobenzene;
(2) 2,4,5-tribromo-nitrobenzene;
(3) 2,4-dichloro-5-trifluoromethyl-nitrobenzene;
(4) 2,5-dichloro-4-trifluoromethyl-nitrobenzene;
(5) 2-chloro-4-trifluoromethyl-nitrobenzene;
(6) 2-chloro-4,5-trifluoromethyl-nitrobenzene;
(7) 2,4-dichloro-5-methyl-nitrobenzene;
(8) 2,5-dichloro-4-methyl-nitrobenzene;
(9) 2-chloro-4-trifluoromethyl-5-methyl-nitrobenzene;
(10) 2-chloro-4-methyl-5-trifluoromethyl-nitrobenzene;
(11) 2-chloro-4-trifluoromethyl-nitrobenzene;
(12) 2-chloro-5-trifluoromethyl-nitrobenzene;
(13) 2,4-dibromo-nitrobenzene;
(14) 2,5-dibromo-nitrobenzene;
(15) 2,3,5-trichloro-nitrobenzene;
(16) 2,5-dichloro-3-methyl-nitrobenzene;
(17) 2,4-dichloro-3-methyl-nitrobenzene.

Group B (1) 2-sulfamyl-4,5-dichloroaniline;
(2) 2-sulfamyl-4,5-dibromoaniline;
(3) 2-sulfamyl-4-chloro-5-trifluoromethyl-aniline;
(4) 2-sulfamyl-4-trifluoromethyl-5-chloroaniline;
(5) 2-sulfamyl-4-trifluoromethyl-aniline;
(6) 2-sulfamyl-4,5-di-trifluoromethyl-aniline;
(7) 2-sulfamyl-4-chloro-5-methyl-aniline;
(8) 2-sulfamyl-4-methyl-5-chloro-aniline;
(9) 2-sulfamyl-4-trifluoromethyl-5-methyl-aniline;
(10) 2-sulfamyl-4-methyl-5-trifluoromethyl-aniline;
(11) 2-sulfamyl-4-trifluoromethyl-aniline;
(12) 2-sulfamyl-5-trifluoromethyl-aniline;
(13) 2-sulfamyl-4-bromoaniline;
(14) 2-sulfamyl-5-bromoaniline;
(15) 2-sulfamyl-3,5-dichloro-aniline;
(16) 2-sulfamyl-3-methyl-5-chloroaniline;
(17) 2-sulfamyl-3-methyl-4-chloro-aniline.

The substitution of a lower alkyl primary amine or an aralkyl amine for the ammonia of the amination step of Step A of Example 1 will produce the appropriate N-substituted-sulfamyl-nitrobenzene, which when processed according to the procedure of Step D of Example 1 will yield a desired starting material.

The preparation of the foregoing starting material is exemplified as follows:

*Example 2.—2-(N-isopropylsulfamyl)-4-chloroaniline*

Step A.—A mixture of 10 g. of 2-nitro-5-chlorobenzene sulfonyl chloride and 50 ml. of isopropyl amine is allowed to react at room temperature for 3 hours. The reaction mixture is evaporated to dryness and the residue crystallized from water yielding N-isopropyl-5-chloro-2-nitrobenzene sulfonamide as a crystalline solid.

Step B.—A mixture of 12.5 g. of the N-isopropyl-5-chloro-2-nitrobenzene sulfonamide, 16.9 g. of ammonium chloride, 140 ml. of methanol and 70 ml. of water is refluxed with continuous stirring. To the stirred refluxing mixture are added 16.9 g. of iron fillings, portionwise, over a period of 1.5 hours, and the mixture is refluxed 1.5 hours longer. The mixture is cooled and filtered. The filtrate is diluted with 350 mls. of water, heated to reflux temperature, treated with activated charcoal, filtered, cooled and allowed to stand until crystals are formed. The crystals are filtered yielding 2-isopropyl-sulfamyl-5-chloroaniline.

The isopropylamine of Step A of Example 2 may be replaced by similarly reacting aliphatic primary amines and aralkyl amines to form the equivalent N-substituted sulfamyl starting materials. Obviously, other 2-nitrobenzene sulfonyl chlorides, such as those compounds formed when the compounds of Group A above are reacted upon according to the procedures of Steps A and B of Example 1, may be similarly treated to form the appropriate X,Y-substituted-N-substituted sulfamyl-nitrobenzene.

*Example 3.—3-methyl-7-chloro-1,2,4-benzothiadiazine-1,1-dioxide*

Heat a mixture of 5 g. of 2-sulfamyl-4-chloroaniline and 15 ml. of ethyl orthoacetate at 100–110° C. for 1.5 hours. Cool and filter the solids. Recrystallize from aqueous ethanol yielding 3-methyl-7-chloro-1,2,4-benzothiadiazine-1,1-dioxide, M.P. 325–327° C.

By replacing the 2-sulfamyl-4-chloroaniline starting material of this example with equivalent quantities of the compounds enumerated in Group B, above, and then following substantially the procedure of this example there are produced, respectively, the following compounds of Group C.

Group C (1) 3-methyl-6,7-dichloro-1,2,4-benzothiadiazine-1,1-dioxide;
(2) 3-methyl-6,7-dibromo-1,2,4-benzothiadiazine-1,1-dioxide;
(3) 3-methyl-6-trifluoromethyl-7-chloro-1,2,4-benzothiadiazine-1,1-dioxide;
(4) 3-methyl-6-chloro-7-trifluoromethyl-1,2,4-benzothiadiazine-1,1-dioxide;
(5) 3-methyl-7-trifluoromethyl-1,2,4-benzothiadiazine-1,1-dioxide;
(6) 3-methyl-6,7-di-trifluoromethyl-1,2,4-benzothiadiazine-1,1-dioxide;
(7) 3,6-dimethyl-7-chloro-1,2,4-benzothiadiazine-1,1-dioxide;
(8) 3-methyl-6-chloro-7-methyl-1,2,4-benzothiadiazine-1,1-dioxide;
(9) 3,6-dimethyl-7-trifluoromethyl-1,2,4-benzothiadiazine-1,1-dioxide;
(10) 3-methyl-6-trifluoromethyl-7-methyl-1,2,4-benzothiadiazine-1,1-dioxide;
(11) 3-methyl-7-trifluoromethyl-1,2,4-benzothiadiazine-1,1-dioxide;
(12) 3-methyl-6-trifluoromethyl-1,2,4-benzothiadiazine-1,1-dioxide;
(13) 3-methyl-7-bromo-1,2,4-benzothiadiazine-1,1-dioxide;
(14) 3-methyl-6-bromo-1,2,4-benzothiadiazine-1,1-dioxide;
(15) 3-methyl-6,8-dichloro-1,2,4-benzothiadiazine-1,1-dioxide;
(16) 3-methyl-6-chloro-8-methyl-1,2,4-benzothiadiazine-1,1-dioxide;
(17) 3-methyl-7-chloro-8-methyl-1,2,4-benzothiadiazine-1,1-dioxide.

For each of the foregoing reactions the ethyl orthoacetate may be replaced by equivalent quantities of other saturated lower aliphatic hydrocarbon-substituted orthoformic esters to produce the corresponding 3-position saturated lower aliphatic hydrocarbon 1,2,4-benzothiadiazine-1,1-dioxide. Thus, in each of the above exemplified and enumerated cases, by replacing the ethyl orthoacetate described for the 1,2,4-benzothiadiazine-1,1-dioxide with equivalent quantities of ethyl orthopropionate, ethyl orthobutyrate and ethyl orthovalerate, there will be produced respectively, the 3-ethyl, 3-propyl and 3-butyl substituents for each of the exemplified and enumerated 1,2,4-benzothiadiazine-1,1-dioxides of Example 3 and Group C.

*Example 4.—3-ethyl-6-methyl-7-chloro-1,2,4-benzothiadiazine-1,1-dioxide*

Heat a mixture of 5 g. of 2-sulfamyl-4-chloro-5-methylaniline with 10 cc. of ethoxypropionaldehyde diethyl acetal at 120–130° C. for 1 hour. Cool the mixture and triturate with ether then filter the solids. Recrystallize from methanol to yield 3-ethyl-6-methyl-7-chloro-1,2,4-benzothiadiazine-1,1-dioxide as a crystalline solid.

The compounds of Group B set forth in Example 1, may be substituted for the 2-sulfamyl-4-chloroaniline of this example to produce the corresponding X,Y-substituted 1,2,4-benzothiadiazine-1,1-dioxide.

*Example 5.—3-butyl-6-chloro-7-methyl-1,2,4-benzothiadiazine-1,1-dioxide*

Heat a mixture of 5 g. of 2-amino-4-methyl-5-chloro-benzensulfonamide, 1 g. of anhydrous sodium butyrate and 50 ml. of butyric acid in an autoclave at 160–170° C. for 5 hours. Cool and triturate with water, then filter the solids. Recrystallize from aqueous ethanol yielding 3-butyl-6-chloro-7-methyl - 1,2,4 - benzothiadiazine-1,1-dioxide.

Again, by using the compounds of Group B enumerated above under Example 1 in place of the 2-amino-4-methyl-5-chloro-benzenesulfonamide, there is produced the appropriate 3-butyl-X,Y-substituted 1,2,4-benzothiadiazine-1,1-dioxide. Similarly, the butyric acid and its corresponding sodium salt can be substituted for by other saturated lower aliphatic hydrocarbon carboxylic acids and their corresponding sodium salts to form the appropriate 3-positioned saturated lower aliphatic hydrocarbon radical.

*Example 6.—3-methyl-7-trifluoromethyl-1,2,4-benzothiadiazine-1,1-dioxide*

Heat a mixture of 5 g. of 2-amino-5-trifluoromethyl-benzenesulfonamide, 1 g. of anhydrous sodium acetate and 50 ml. of acetyl chloride at reflux temperature for 4 hours. Cool and filter the solids. Recrystallize from aqueous ethanol to yield 3-methyl-7-trifluoromethyl-1,2,4-benzothiadiazine-1,1-dioxide.

The 2 - amino-5 - trifluoromethyl benzenesulfonamide may be replaced by the compounds of Group B enumerated above, and the acetyl chloride may be replaced by other acid chlorides and acid anhydrides hereinabove described, to produce the corresponding 1,2,4-benzothiadiazine-1,1- dioxide.

*Example 7.—3-methyl-6,7-dichloro-1,2,4 benzothiadiazine-1.1-dioxide*

(A) 1-(α-ETHOXY ETYLIDENE)-AMINO-2-(N-BENZYL)-SULFAMYL-4,5-DICHLORO BENZENE

*Step A.*—Suspend 50 g. of 2-benzylthio-4,5-dichloro-nitrobenzene in 1000 ml. of 33% aqueous acidic acid. Bubble chlorine gas through the suspension for a period of 2 hours while maintaining the suspension at a temperature in the range of about 50° C. Extract the mixture 3 times with 400 ml. of chloroform, pool the extracts, and wash the chloroform solution with water. Dry the chloroform solution with anhydrous sodium sulfate and filter. Evaporate the dried chloroform solution to a residue and add to an excess of benzylamine. Triturate the residue with dilute hydrochloric acid and decant. Triturate the residue with hexane to for a crystalline solid, continue trituration with water and filter the solid to yield substantially pure 2-N-(benzyl)-sulfamyl-4,5-dichloro-nitrobenzene. Recrystallize from aqueous methanol.

*Step B.*—Mix together 4.4 g. of ammonium chloride, 18 ml. of methanol, 9 ml. of water and 3.5 g. of 2-N-(benzylsulfamyl-4,5-dichloro-nitrobenzene. Heat the mixture to reflux temperature. Add portion-wise 4.4 g. of iron filings during a period of about 1.5 hours. Cool the mixture and filter. Concentrate the filtrate to a residue. Triturate the residue with 15 ml. of water and filter the solid. Recrystallize the solid from aqueous methanol to yield 2-(N-benzyl)sulfamyl-4,5-dichloroaniline.

*Step C.*—Heat a mixture of 10 g. of 2-(N-benzyl)sulfamyl-4,5-dichloroaniline and 20 ml. of ethyl orthoacetate at 100–110° C. for 90 minutes. Cool and triturate with 30 ml. of ether and filter the solids to yield 1-(α-ethoxy ethylidene)-amino-2(N-benzyl)-sulfamyl-4,5-dichlorobenzene.

*Step D.*—Heat product from Step C at 235° C. for 30 minutes. Cool and recrystallize the residue from methanol yielding 3 - methyl - 6,7 - dichloro - 1,2,4-benzothiadiazine-1,1-dioxide as a crystalline solid. By substituting equivalent quantities of other 2-benzyl-thio-X,Y-substituted nitrobenzenes such as those formed in the preparation of the compounds enumerated in Group B above, for the 2-benzylthio-4,5-dichloro-nitrobenzene of this example and by following substantially the procedures outlined above, there are produced respectively, the corresponding 2 - N - benzyl - sulfamyl - 1(α - ethoxy ethylidene)amino-X,Y-substituted benzenes.

Similarly, the benzylamine may be replaced by isopropylamine, butylamine and other similar amines to produce the correspondingly substituted sulfamyl radical.

*Example 8.—3-Cyclopropyl-6,7-dichloro-1,2,4-benzothiadiazine-1,1-dioxide*

(A) 2-(CYCLOPROPANECARBONYL)-AMINO-4,5-DICHLORO-BENZENESULFONAMIDE

A mixture containing 6.0 g. of 2-amino-4,5-dichloro-benzenesulfonamide and 15.3 g. of cyclopropane carbonyl chloride in 150 ml. of dry benzene is refluxed for 6 hours, cooled and filtered to yield crude 2-(cyclopropane carbonyl)-amino-4,5-dichloro-benzenesulfonamide.

(B) 3-CYCLOPROPYL-6,7-DICHLORO-1,2,4-BENZOTHIADIAZINE-1,1-DIOXIDE

A suspension containing 5.8 g. of 2-(cyclopropane-carbonyl) amino-4,5-dichloro-benzenesulfonamide in 10 ml. of mineral oil is heated (with stirring) at 225° C. for 30 minutes cooled and filtered to yield crude 3-cyclopropyl-6,7-dichloro-1,2,4-benzothiadiazine-1,1-dioxide which is purified by crystallization from methanol.

*Example 9.—3-methyl-6,7-dichloro-1,2,4-benzothiadiazine-1,1-dioxide*

(A) 2-ACETYLAMINO-4,5-DICHLORO-BENZENESULFONAMIDE

Heat a mixture of 9 g. of 2-sulfamyl-4,5-dichloro-aniline, 250 ml. of benzene and 26 ml. of acetylchloride at reflux temperature for 4 hours. Cool the mixture and filter the solids. Recrystallize the solids from aqueous ethanol to yield 2-acetylamino-4,5-dichloro-benzenesulfonamide.

(B) 3-METHYL-6,7-DICHLORO-1,2,4-BENZOTHIADIAZINE-1,1-DIOXIDE

Heat the 2 - acetylamino - 4,5 - dichloro - benzenesulfonamide at 200° C. for 10 minutes. Cool and recrystallize the solids from aqueous ethanol to yield 3-methyl-6,7-dichloro-1,2,4-benzothiadiazine-1,1-dioxide.

By replacing the acetyl chloride of this example with equivalent quantities of another saturated lower aliphatic hydrocarbon, carbonyl chloride (or the corresponding saturated lower aliphatic hydrocarbon carboxylic acid anhydride), such as propionyl chloride, butyryl chloride, cyclopropane carbonyl chloride, isobutyryl chloride, valeryl chloride, trimethyl acetyl chloride, caproyl chloride, and by following substantially the general procedure outlined in A above, there is produced respectively, 2-(propionyl) amino-4,5-dichloro-benzenesulfonamide; 2-(butyryl) amino - 4,5 - dichloro - benzenesulfonamide; 2-(cyclo - propane carbonyl)amino - 4,5 - dichloro - benzenesulfonamide; 2 - (isobutyryl) amino - 4,5 - dichloro-benzenesulfonamide; - 2 - (valeryl) amino - 4,5 - dichloro - benzenesulfonamide; 2(trimethylacetyl) amino-4,5 - dichloro - benzenesulfonamide; 2 - (caproyl) - 4,5-dichloro-benzene-sulfonamide.

Similarly, with each of the foregoing saturated lower aliphatic hydrocarbon carbonyl chloride reactants in combination with the o-sulfamylaniline compounds enumerated in Group B of Example I and by following substantially the same procedure outlined above, there is produced the corresponding 2-(saturated lower aliphatic hydrocarbon carbonyl) amino-X,Y-substituted-benzenesulfonamide.

*Example 10.—3-methyl-7-bromo-1,2,4-benzothiadiazine-1,1-dioxide*

(A) 1-ACETYLAMINO-2-(N-ACETYL)SULFAMYL-4-BROMOBENZENE

A mixture of 1 g. of 2-sulfamyl-4-bromoaniline, 4.0 ml. of pyridine and 2 g. of acetic anhydride is heated at a temperature of 50° C. for 4 hours. The solids are filtered to yield crude1 - acetylamino - 2 - (N - acetyl)sulfamyl - 4-bromobenzene.

(B) 3-METHYL-7-BROMO-1,2,4-BENZOTHIADIAZINE-1,1-DIOXIDE

The 1 - acetylamino - 2 - N - acetyl)sulfamyl - 4-bromobenzene is heated at 250° C. for 30 minutes, cooled and the filtrate recrystallized from aqueous ethanol to yield 3 - methyl - 7 - bromo - 1,2,4 - benzothiadiazine-1,1-dioxide.

Changes in the reactants analogous to those changes following the specific exemplification of Example 9 and by following substantially the same procedures outlined in part A of this example, will give rise to the formation of the corresponding X,Y-substituted N,N'-diacylamino-benzenesulfonamide, which when treated according to the procedure of Part B of this example will produce the corresponding X,Y-substituted 3-R-1,2,4-benzothiadiazine-1,1-dioxide.

*Example 11.* — *3-methyl-7-chloro-1,2,4-benzothiadiazine-1,1-dioxide*

(A) 2-DIACETYLAMINO-5-CHLORO-BENZENE-SULFONAMIDE

Heat a mixture of 10 g. of 2-amino-5-chloro-benzenesulfonic acid and 50 ml. of acetic anhydride in an autoclave for 3 hours at 140–150° C. Remove the excess acetic anhydride in vacuo to yield 2-diacetylamino-5-chloro-benzenesulfonic acid.

A mixture containing 5 g. of 2-diacetylamino-5-chloro-benzenesulfonic acid and 5 g. of dimethylformamido chloride (formed from equivalent quantities of thionyl chloride and dimetehylformamide) is dissolved in 100 ml. of dimethylformamide and kept at 30–35° C. for 24 hours. The reaction mixture is poured onto ice and the product extracted with benzene. The benzene solution is washed with water, dried over anhydrous sodium sulfate and the benzene evaporated to a residue to yield 2-diacetylamino-5-chloro-benzenesulfonyl chloride which is treated with 25 ml. of ammonia. The excess ammonia is evaporated to yield 2-diacetylamino-5-chloro-benzenesulfonamide.

(B) 3-METHYL-7-CHLORO-1,2,4-BENZOTHIADIAZINE-1,1-DIOXIDE 2-diacetylamino-5-chloro-benzenesulfonamide is heated at 250° C. for 15 minutes, cooled and the residual product is triturated with water, filtered and recrystallized from aqueous ethanol to yield 3-methyl-7-chloro-1,2,4-benzothiadiazine -1,1-dioxide.

By replacing the 2-amino-5-chloro-benzenesulfonic acid of part A of this example with other substituted benzenesulfonic acids, other 2-diacylamino-benzenesulfonamides are prepared. Thus, by substituting a benzenesulfonic acid from Group D, below, subjecting same to the procedure of this example there are produced respectively, the diacyl intermediates set forth below in Group E. There are transformed into the respective benzothiadiazines (Group C of Example 3) by heating as described in this example.

Group D (1) 2-amino-4,5-dichloro-benzenesulfonic acid;
(2) 2-amino-4,5-dibromo-benzenesulfonic acid;
(3) 2 - amino-4-trifluoromethyl-5-chloro-benzenesulfonic acid;
(4) 2 - amino-4-chloro-5-trifluoromethyl-benzenesulfonic acid;
(5) 2-amino-5-trifluoromethyl-benzenesulfonic acid;
(6) 2-amino-4,5-ditrifluoromethyl-benzenesulfonic acid;
(7) 2-amino-4-methyl-5-chloro-benzenesulfonic acid;
(8) 2-amino-4-chloro-5-methylbenzenesulfonic acid;
(9) 2 - amino-4-methyl-5-trifluoromethylbenzenesulfonic acid;
(10) 2 - amino - 4 - trifluoromethyl-5-methylbenzenesulfonic acid;
(11) 2-amino-5-trifluoromethyl-benzenesulfonic acid;
(12) 2-amino-4-trifluoromethyl-benzenesulfonic acid;
(13) 2-amino-5-bromo-benzenesulfonic acid;
(14) 2-diacetylamino-4-bromo-benzenesulfonamide;
(15) 2-amino-4,6-dichloro-benzenesulfonic acid;
(16) 2-amino-4-chloro-6-methyl-benzenesulfonic acid;
(17) 2-amino-5-chloro-6-methyl-benzenesulfonic acid.

Group E (1) 2-diacetylamino-4,5-dichloro-benzenesulfonamide;
(2) 2-diacetylamino-4,5-dibromo-benzenesulfonamide;
(3) 2 - diacetylamino-4-trifluoromethyl-5-chloro-benzenesulfonamide;
(4) 2 - diacetylamino-4-chloro-5-trifluoromethyl-benzenesulfonamide;
(5) 2 - diacetylamino - 5-trifluoromethyl-benzenesulfonamide;
(6) 2 - diacetylamino - 4,5-di-trifluoromethyl-benzenesulfonamide;
(7) 2 - diacetylamino - 4-methyl-5-chloro-benzenesulfonamide;
(8) 2 - diacetylamino - 4-chloro-5-methyl-benzenesulfonamide;
(9) 2 - diacetylamino-4-methyl-5-trifluoromethyl-benzenesulfonamide;
(10) 2 - diacetylamino - 4 - trifluoromethyl - 5 - methyl-benzenesulfonamide;
(11) 2 - diacetylamino - 5 - trifluoromethyl - benzenesulfonamide;
(12) 2 - diacetylamino - 4 - trifluoromethyl - benzenesulfonamide;
(13) 2-diacetylamino-5-bromo-benzenesulfonamide;
(14) 2-diacetylamino-4-bromo-benzenesulfonamide;
(15) 2-diacetylamino-4,6-dichloro-benzenesulfonamide;
(16) 2 - diacetylamino-4-chloro-6-methyl-benzenesulfonamide;
(17) 2 - diacetylamino-5-chloro-6-methyl-benzenesulfonamide.

*Example 12.* — *3-methyl-7-chloro-1,2,4-benzothiadiazine-1,1-dioxide*

(A) N-ACETYL-2-NITRO-5-CHLORO-BENZENE-SULFONAMIDE

Heat at reflux temperature a mixture of 2-nitro-5-chloro-benzenesulfonamide, 2 g. of acetylchloride and 4 ml. of pyridine for 4 hours. Cool and filter the solids. Recrystallize from aqueous ethanol to yield N-acetyl-2-nitro-5-chloro-benzenesulfonamide.

(B) 1-ACETYLSULFAMYL-2-AMINO-5-CHLORO-BENZENE

Mix together 4.4 g. of ammonium chloride, 18 ml. of methanol, 9 ml. of water and 3.3 g. of N-acetyl-2-nitro-5-chloro-benzenesulfonamide. Heat the mixture at reflux temperature. Add portionwise 4.4 g. of iron filings during a period of about 1.5 hours. Cool the mixture and filter. Concentrate the filtrate to a residue. Triturate the residue with 15 ml. of water and filter the solid. Recrystallize the solid from aqueous methanol to yield substantially pure 1-acetylsulfamyl-2-amino-5-chlorobenzene.

(C) 3-METHYL-7-CHLORO-1,2,4-BENZOTHIADIAZINE-1,1-DIOXIDE

Heat the 1-acetylsulfamyl-2-amino-5-chloro-benzene at 230° C. for 30 minutes. Cool and recrystallize the solids from aqueous methanol to yield 3-methyl-7-chloro-1,2,4-benzothiadiazine-1,1-dioxide.

By replacing the 2-nitro-5-chloro-benzenesulfonamide of this example with other benzenesulfonamides, the production of the corresponding acylated benzenesulfonamides may be effected by following substantially the procedures described above. Therefore, by replacing the aforesaid 2-nitro-5-chloro-benzenesulfonamide with the particular sulfonamide enumerated below in Group F, and by following substantially the procedures of Step A above there are produced respectively the corresponding N-acyl-2-nitro substituted benzene sulfonamides enumerated in Group G below.

Group F (1) 2-nitro-6,7-dichloro-benzenesulfonamide;
(2) 2-nitro-6,7-dibromo-benzenesulfonamide;
(3) 2-nitro-6-trifluoromethyl-7 - chloro - benzenesulfonamide;
(4) 2-nitro-6-chloro-7-trifluoromethyl - benzenesulfonamide;
(5) 2-nitro-7-trifluoromethylbenzenesulfonamide;
(6) 2-nitro-6,7-di-trifluoromethyl-benzenesulfonamide;
(7) 2-nitro-6-methyl-7-chloro-benzenesulfonamide;

(8) 2-nitro-6-chloro-7-methyl-benzenesulfonamide;
(9) 2-nitro-6-methyl-7-trifluoromethyl-benzenesulfonamide;
(10) 2-nitro-6-trifluoromethyl-7-methyl - benzenesulfonamide;
(11) 2-nitro-7-trifluoromethyl-benzenesulfonamide;
(12) 2-nitro-6-trifluoromethyl-benezenesulfonamide;
(13) 2-nitro-7-bromo-benzenesulfonamide;
(14) 2-nitro-6-bromo-benzenesulfonamide;
(15) 2-nitro-6,8-dichloro-benzenesulfonamide;
(16) 2-nitro-6-chloro-8-methylbenzenesulfonamide;
(17) 2-nitro-7-chloro-8-methyl-benzenesulfonamide.

Group G (1) N-acetyl-6,7-dichloro-2-nitro-benzenesulfonamide;
(2) N-acetyl-6,7-dibromo-2-nitro-benzenesulfonamide;
(3) N-acetyl-6-trifluoromethyl-7-chloro - 2 - nitro - benzenesulfonamide;
(4) N-acetyl-6-chloro-7-trifluoromethyl - 2 - nitro - benzenesulfonamide;
(5) N-acetyl-7-trifluoromethyl-2 - nitro - benzenesulfonamide;
(6) N-acetyl-6,7-di-trifluoromethyl - 2 - nitro - benzenesulfonamide;
(7) N-acetyl-6-methyl-7-chloro - 2 - nitro - benzenesulfonamide;
(8) N-acetyl-6-chloro-7-methyl-2 - nitro - benzenesulfonamide;
(9) N-acetyl-6-methyl-7-trifluoromethyl-2 - nitro - benzenesulfonamide;
(10) N-acetyl-6-trifluoromethyl-7-methyl-2 - nitro - benzenesulfonamide;
(11) N-acetyl-7-trifluoromethyl-2 - nitro - benzenesulfonamide;
(12) N-acetyl-6-trifluoromethyl-2 - nitro - benzenesulfonamide;
(13) N-acetyl-7-bromo-2-nitro-benzenesulfonamide;
(14) N-acetyl-6-bromo-2-nitro-benzenesulfonamide;
(15) N-acetyl-6,8-dichloro-2-nitro-benzenesulfonamide;
(16) N-acetyl-6-chloro-8-methyl-2-nitro - benzenesulfonamide;
(17) N-acetyl-7-chloro-8-methyl-2 - nitro - benzenesulfonamide.

These compounds upon reduction as described herein yield the corresponding amino analogs which are processed to yield the benzothiadiazines of this invention as described herein.

The subject matter to be claimed is:

1. A substituted aniline of the formula:

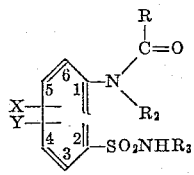

wherein X is a member of the group consisting of halogen and trifluoromethyl located at positions 4- or 5-, Y is a member of the group consisting of halogen, trifluoromethyl, methyl, or hydrogen located at one of the unsubstituted 3-, 4-, or 5-positions, $R_2$ is a member of the group consisting of hydrogen and

$R_3$ is a member of the group consisting of benzyl, lower alkyl, and

with the proviso that at least one of $R_2$ and $R_3$ is other than

and R is a member of the group consisting of lower alkyl, cyclopropyl, cyclobutyl and cyclopentyl.

2. A compound of claim 1 wherein $R_2$ is hydrogen, $R_3$ is

R is lower alkyl, X is halogen and Y is hydrogen.

3. A compound of claim 1 wherein $R_2$ is hydrogen, R and $R_3$ are lower alkyl, X and Y are halogen.

4. A ring halogenated -2-(N-acylsulfamyl)-acylanilide compound of claim 1 wherein the acyl groups are

R being lower alkyl.

5. A ring-halogenated 2-diacylamino benzenesulfonamide of claim 1 wherein the acyl radicals are

R being lower alkyl.

References Cited

UNITED STATES PATENTS

| | | | |
|---|---|---|---|
| 2,891,049 | 6/1959 | Exner et al. | 260—556 |
| 2,394,307 | 2/1946 | Rodleben et al. | 260—556 |
| 2,353,569 | 7/1944 | Knecht et al. | 260—556 |

JOHN D. RANDOLPH, *Primary Examiner.*

WALTER A. MODANCE, *Examiner.*

H. I. MOATZ, *Assistant Examiner.*